(12) United States Patent
Davidson et al.

(10) Patent No.: US 8,413,371 B2
(45) Date of Patent: Apr. 9, 2013

(54) MUSHROOM GROWING MATERIAL APPLICATION SYSTEM

(75) Inventors: James E. Davidson, Landenberg, PA (US); Marshall Thompson, Elkton, MD (US); Steven L. Fidanza, Avondale, PA (US)

(73) Assignee: CO2 Boost LLC, Avondale, PA (US)

( * ) Notice: Subject to any disclaimer, the term of this patent is extended or adjusted under 35 U.S.C. 154(b) by 450 days.

(21) Appl. No.: 12/844,873

(22) Filed: Jul. 28, 2010

(65) Prior Publication Data
US 2011/0031269 A1 Feb. 10, 2011

Related U.S. Application Data

(60) Provisional application No. 61/232,059, filed on Aug. 7, 2009.

(51) Int. Cl.
*A01G 1/04* (2006.01)
(52) U.S. Cl. .......................................................... 47/1.1
(58) Field of Classification Search .............. 47/1.1, 47/101 R; 119/51.04, 56.2, 57.2, 57.3, 57.91; 198/550.1, 550.6; 222/226, 608; 118/19, 118/417, 418; 427/180
See application file for complete search history.

(56) References Cited

U.S. PATENT DOCUMENTS

| | | | | | |
|---|---|---|---|---|---|
| 2,723,493 | A | * | 11/1955 | Stoller | 47/1.1 |
| 2,994,160 | A | * | 8/1961 | Sinden et al. | 47/1.1 |
| 3,498,479 | A | * | 3/1970 | Smoker et al. | 414/311 |
| 3,542,250 | A | * | 11/1970 | McRitchie | 239/654 |
| 3,710,964 | A | * | 1/1973 | Douglass, Jr. | 414/327 |
| 4,023,525 | A | * | 5/1977 | Weber | 118/303 |
| 5,037,266 | A | * | 8/1991 | Jurgensmeyer | 414/528 |

* cited by examiner

*Primary Examiner* — Rob Swiatek
*Assistant Examiner* — Ebony Evans
(74) *Attorney, Agent, or Firm* — Novak Druce Connolly Bove + Quigg LLP

(57) ABSTRACT

A system for applying mushroom growing materials includes a hopper for the materials. A blower unit creates an air stream which acts as a carrier for blowing the material fed by the hopper through a transport hose wrapped partially around a reel. The hose communicates with and feeds the material to an applicating head which is mounted on a mushroom bed. The material is conveyed through the applicating head by being spread in a transverse direction by a distributor. The material is then fed to an applicating member which is preferably a conveyor belt. The conveyor belt deposits the material onto the mushroom bed.

21 Claims, 3 Drawing Sheets

MUSHROOM GROWING MATERIAL APPLICATION SYSTEM

CROSS REFERENCE TO RELATED APPLICATION

This application is based on provisional application Ser. No. 61/232,059, filed Aug. 7, 2009, all of the details of which are incorporated herein by reference thereto.

BACKGROUND OF THE INVENTION

In the growing of mushrooms a mushroom house generally includes rows of columns each containing mushroom beds. The growing of the mushrooms occurs in different stages. For example, peat moss is applied as a casing layer. In Phase 1 unpasteurized compost is applied to the mushroom beds. During Phase 2 pasteurized compost is applied. In Phase 3 spawn colonized compost is applied. Generally, the application of these mushroom growing materials is done manually by a worker applying the bulk materials to the mushroom bed. Such conventional techniques are costly and may lack uniformity.

It would be desirable if some techniques could be used which apply the mushroom growing material during various growing stages in an automatic manner with minimal manual dependence.

SUMMARY OF THE INVENTION

An object of this invention is to provide a system for applying mushroom growing material to a mushroom growing bed wherein the material is automatically applied.

A further object of this invention is to provide such a system which could be used for applying various different bulk materials as needed in mushroom production.

In accordance with this invention the mushroom growing material is initially in a hopper which communicates with a blower unit. The blower unit creates a stream of air that acts as a carrier for blowing the material through a transport hose that leads into the mushroom house. The hose is in flow communication with an applicating head mounted for longitudinal movement over a mushroom bed. The applicating head comprises a housing having an inlet in flow communication with the hose for receiving the material. The material is then directed to a distributor, such as a star wheel and/or an augur, mounted in the housing which spreads the material transversely and feeds the material to an applicating member, such as a conveyor belt. A portion of the applicating member or conveyor belt is located at a discharge section of the housing to deposit the material on the mushroom bed.

In a preferred practice of this invention the hose is at least partially wound around a reel. The hose is a live hose which does not collapse so that the air stream continues to carry the material through the hose even while it is wound around the reel.

The housing may include a leveling gate located at the applicating member or conveyor belt to provide a uniform amount of material being deposited onto the mushroom bed.

The hopper and blower unit may be mounted in a trailer outside the mushroom house so as to be protected from the elements. The reel could be mounted either inside the mushroom house or outside and adjacent to the mushroom house. The applicating head housing is preferably mounted on rollers to facilitate longitudinal movement over the mushroom bed.

The system could be used for applying various different bulk materials as needed in mushroom production. For example, peat moss could be applied as a casing layer. During Phase 1 unpasteurized compost could be applied. During Phase 2 pasteurized compost could be applied. During Phase 3 spawn colonized compost could be applied.

THE DRAWINGS

DETAILED DESCRIPTION

Figure 1:
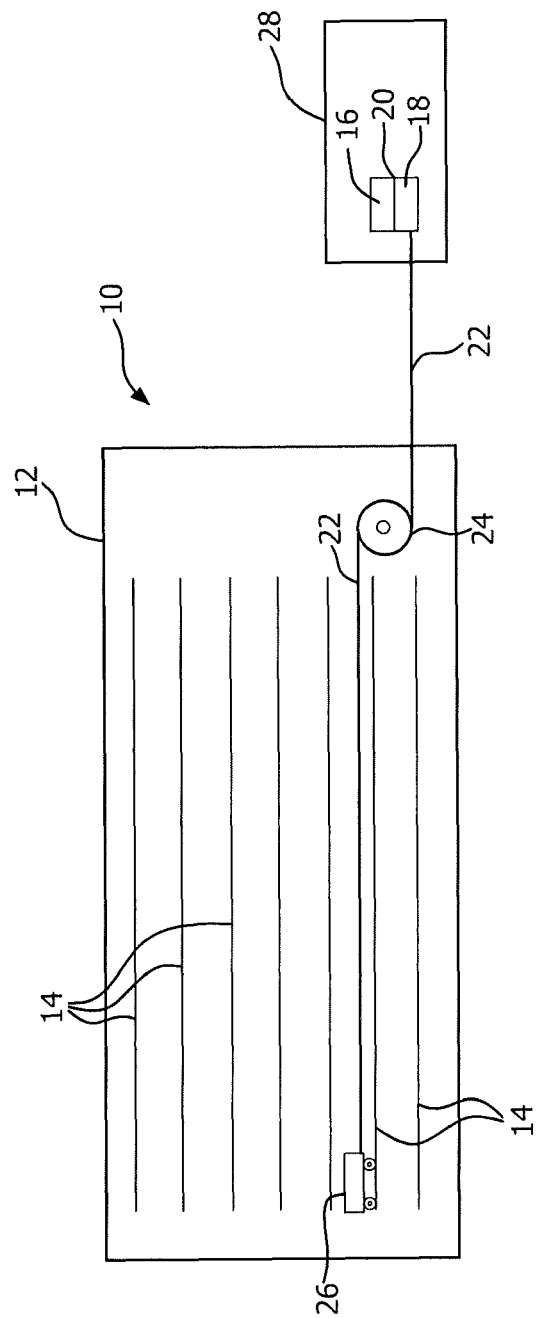
FIG. 1 is a schematic view showing a system for applying mushroom growing materials in accordance with this invention.

FIG. 1 schematically illustrates a system 10 for applying mushroom growing materials. The system 10 could be used with a conventional mushroom house 12 having rows of vertical columns of mushroom beds 14.

As schematically shown in FIG. 1 a portion of system 10 which is external of mushroom house 12 includes a hopper 16 mounted in flow communication with a blower unit 18. Preferably any suitable hopper filters 20 could be provided to filter the material being transported through system 10 and thereby reduce disease.

Hopper 16 and filters 20 may be of any suitable known form. Blower unit 18 could also be of any suitable form which is capable of providing a sufficient stream of air to act as a carrier for conveying the material from hopper 16 through system 10. One suitable form of blower unit is a bark blower such as model BB705 from Finn Corporation. Other comparable blowers could also be used. Such blower unit 18 would blow the air carrying the material into a transport hose 22 which is an important part of system 10. Where, for example, a bark blower is used the blower unit 18 may have a capacity of 4.5 cubic yards with the blower being at 820 cfm at 12 psi and could operate with a hose reel capacity of 150 ft.

Hose 22 is at least partially wound around reel 24. If desired, reel 24 could be electrically powered for winding and unwinding the hose 22 and more particularly the downstream portion of the hose that extends over a mushroom bed 14.

Figure 2:
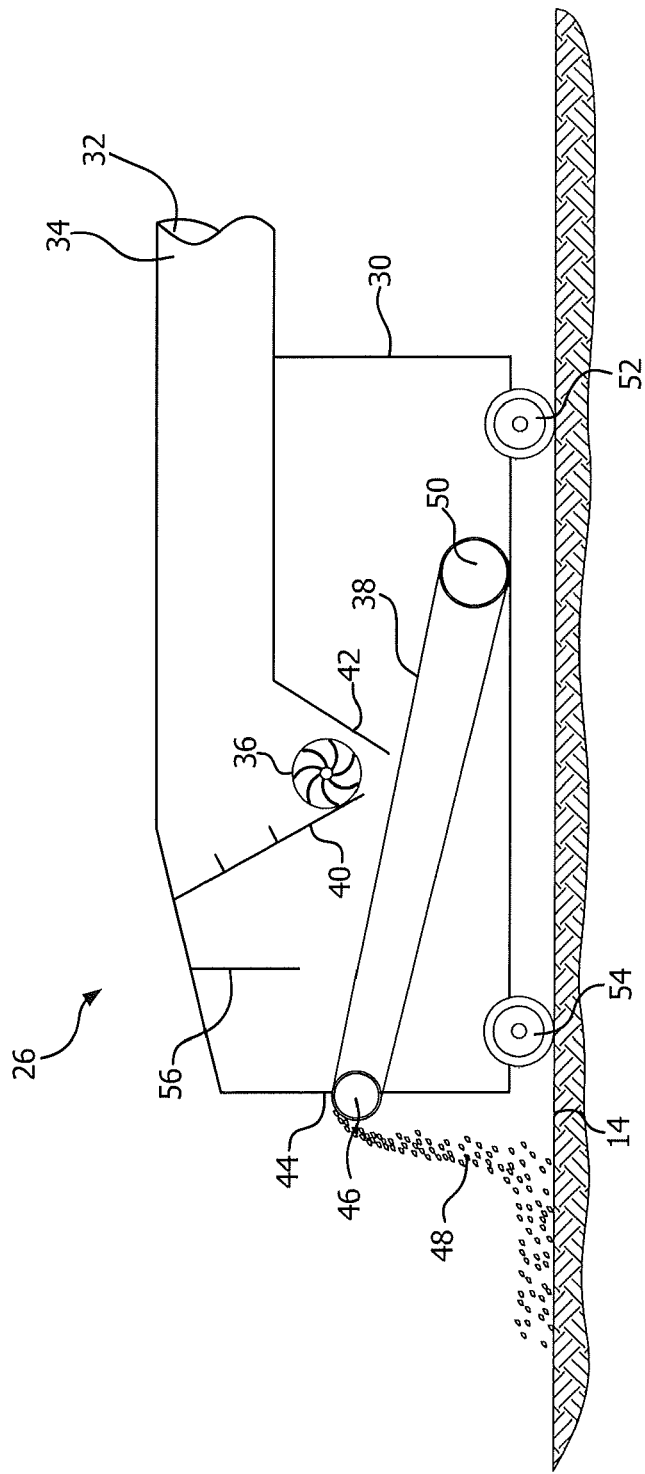
FIG. 2 is a schematic view of an applicating head which is part of the system shown in FIG. 1.
Figure 3:
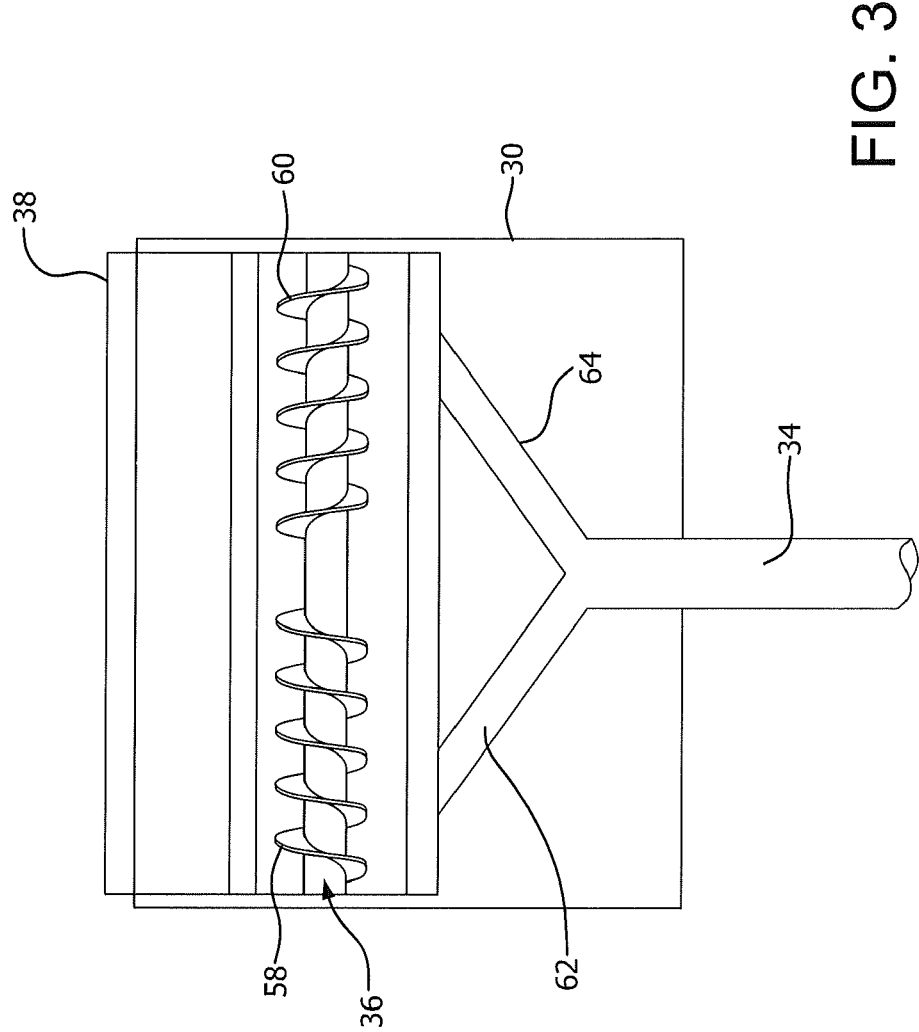
FIG. 3 is a top plan view of a portion of the applicating head shown in FIG. 2.

As also shown in FIG. 1 hose 22 communicates with an applicating head 26 which is illustrated in greater detail in FIGS. 2-3.

As shown in FIG. 1 the hopper 16 and blower 18 are preferably mounted inside a trailer 28 so as to be protected from the elements. Reel 24 could be mounted inside the mushroom house 12 if space permits. Alternatively, reel 24 could be mounted outside mushroom house 12 and hose 22 would extend through a suitable opening in the wall of mushroom house 12.

As shown in FIG. 2 applicating head 26 is in the form of a housing 30 having any suitable connection 32 at its inlet 34 for connection to and flow communication with the hose 22. The inlet 34 forms a passageway which is in flow communication with a distributor 36. Distributor 36 is located above applicating member 38 to spread the material transversely and deposit the material onto the applicator member 38. In a preferred practice of this invention distributor 36 is a star wheel and/or an auger and applicating member 38 is a conveyor belt. The inclined walls 40,42 form a chute to direct the material from auger 36 onto conveyor belt 38.

Housing 30 includes a discharge section 44 located at its end remote from hose coupling 32. Roller 46 for the conveyor belt 38 extends at least partially out of the discharge section 44 so that the growing material 48 being transported on conveyor 38 is deposited onto the mushroom bed 14. The conveyor belt 38 also travels around roller 50. Either roller 46 or roller 50 could be power driven.

FIG. 2 illustrates the conveyor belt 38 to be inclined upwardly toward the discharge section 44 of housing 30. This helps assure control of the material 48 being deposited by conveyor belt 38 in that there would be no tendency of the material under the force of gravity to fall in a non-uniform manner from the conveyor belt 38. Instead the material 48 falls as the belt 38 changes direction going around roller 46. The invention, however, could be practiced where conveyor belt 38 is completely horizontal or is inclined downwardly toward the discharge section 44 of housing 30.

Housing 30 may be of any suitable dimension, such as being approximately six inches high and five feet four inches wide to effectively cover the width of a mushroom bed and yet be of sufficiently small height to fit between vertically adjacent beds.

As shown in FIG. 2 housing 30 is provided with sets of rollers 52,54. One of these rollers, such as roller 52, could be a drive roller for moving the housing longitudinally over the bed 14.

In one practice of this invention applicating head 26 would initially be mounted at the end of the bed 14 remote from reel 24. As the material 48 is being applied to the mushroom bed 14, the housing moves longitudinally toward the opposite end of the bed in a direction toward reel 24. During this movement hose 22 continues to wrap around reel 24. Hose 22 is a live hose in the sense that it does not collapse, but remains open so that the air stream functioning as a carrier from blower unit 18 will continue to convey the material 48 through hose 22 even while the hose is wrapped around reel 24. If desired, reel 24 could be electrically powered to assist in the longitudinal movement of applicating head 26. The speed of movement of the housing 30 over the bed 14 and the speed of movement of the conveyor belt 38 in conjunction with the spacing of the leveling gate 56 will determine the amount of material 48 or its thickness deposited on the mushroom bed 14. When a bed has been sufficiently filled with the material 48, the applicating head 26 would be moved to a different bed.

In order to assure a uniform application of the material 48, applicating head 26 includes a leveling gate 56 which would be mounted in any suitable manner such as being suspended from the roof of housing 30 and could be adjusted in length to control the degree of its spacing from conveyor belt 38 so that the distance between the lower end of gate 56 and the top of conveyor belt 38 would control the level of the material on conveyor belt 38 and thereby control the amount of material 48 deposited onto the mushroom bed 14.

Conveyor belt 38 and leveling gate 56 preferably have a width which extends a distance comparable to the width of the mushroom bed 14 so that material 48 is deposited in and spread completely across bed 14.

Any suitable form of distributor 36 could be used for transversely spreading the material and depositing the material onto the applicating member or conveyor belt 38. In a preferred practice of this invention the distributor 36 is a star wheel and/or an auger. FIGS. 2-3 illustrate the distributor 36 to be an auger wherein the auger screw would convey the material transversely across the auger to help assure that a uniform amount of material 48 is spread across the width of the conveyor belt 38. The distributor/auger 36 would also be of a length that corresponds to the width of the conveyor belt 38.

FIG. 3 illustrates one form of auger 36 in accordance with one preferred practice of this invention. As shown therein, auger 36 is a split auger having a screw portion 58 extending from one side of housing 30 toward the center in an opposite inclination to the screw portion 60 extending from the other side of housing 30 to the center. In this manner the material would be fed from inlet passage 34 into end branches 62,64 which lead toward the sides of housing 30 at each end of auger 36 so that the material enters the auger at each end and is then conveyed from each end toward the center. Alternatively, the auger could have its screw inclined in the same direction throughout its length. The material 48 could be spread from one end of the auger to its opposite end.

As should be apparent, the invention thereby effectuates the concept of using a blower unit for filling the beds of mushroom houses with various different bulk materials as needed in mushroom production. One use of the system 10 would be to supply the material for a casing layer into the hopper 16 which would then transfer through the blower unit 18 so that the air from the blower unit would act as a carrier to convey the material through hose 22 and into applicating head 26. The material would then be applied in uniform manner and thickness to each mushroom bed 14. The system 10 could also provide the option of adding casing material and liquid ingredients to aid in a better product.

The system 10 could be used in various stages of mushroom growth. The applicating head could fill the mushroom beds with a substrate that produces the base food for the mushrooms. This could be done by depositing on the mushroom bed peat moss for a casing layer and/or unpasteurized compost in Phase 1 and/or pasteurized compost in Phase 2 and/or spawn colonized compost in Phase 3. In all such practices the material would be transferred by the air into the custom applicating head 26 and then to the desired space in the mushroom house.

What is claimed is:

1. A system applying mushroom growing material to a mushroom growing bed in a mushroom house comprising a hopper for the material, a transport hose, a blower unit communicating with said hopper and said hose for creating an air stream which functions as a carrier for blowing the material through said hose, an applicating head for being longitudinally movably mounted on the mushroom growing bed, said hose being a flow communication with said applicating head to feed the material into said applicating head, said applicating head including a housing having an inlet for receiving the material blown through said hose, a distributor in said housing in flow communication with said inlet for receiving the material flowing through said inlet and into said housing and spreading the material transversely, a discharge section in said housing, an applicating member in said housing in flow communication with said distributor for receiving the material from said distributor, and said applicating member being located at said discharge section of said housing to deposit the material on the mushroom bed whereby the material may be blown through said hose and deposited on the mushroom bed as said applicating head moves longitudinally over the mushroom bed.

2. The system of claim 1 wherein said hose is at least partially wound on a reel, and said hose being a live hose which maintains its flow capability to permit the material to be blown through said hose even while said hose is wound on said reel.

3. The system of claim 2 wherein said applicating member is a conveyor belt extending partially out of said housing.

4. The system of claim 3 including a leveling gate mounted above said conveyor belt to control the level of material transported on said conveyor belt toward said discharge section.

5. The system of claim 4 wherein said distributor is an auger.

6. The system of claim 5 wherein said auger is a split auger for simultaneously conveying the material from each end of said auger toward the center of said auger.

7. The system of claim 4 wherein said distributor is a star wheel.

8. The system of claim 7 including at least one hopper filter for filtering the material being discharged from said hopper.

9. The system of claim 4 wherein said hopper and said blower unit are mounted in a trailer externally of the mushroom house.

10. The system of claim 4 wherein said reel is mounted in the mushroom house.

11. The system of claim 4 wherein said reel is mounted outside of said mushroom house.

12. The system of claim 4 wherein said housing includes rollers for facilitating the longitudinal movement of said housing over the mushroom bed.

13. A method of applying mushroom growing material to a mushroom growing bed in a mushroom house comprising: supplying the material to a hopper, conveying the material from the hopper through a transport hose by use of a blower unit which communicates with the hopper and the hose and creates an air stream which functions as a carrier for blowing the material through the hose, supplying the material from the hose into an applicating head located on a mushroom bed with the applicating head including a housing and a distributor and an applicating member, conveying material through the housing by first conveying the material from the hose to the distributor in the housing which spreads the material in a transverse direction and directs the material onto the applicating member, depositing the material from the applicating member onto the mushroom bed, and moving the application head longitudinally over the mushroom bed as the material is being applied to the mushroom bed.

14. The method of claim 13 wherein the distributor spreads the material in a transverse direction, the applicating member being a conveyor belt located under the distributor and extending partially out of the housing, the conveyor belt moving the material to a discharge section of the housing, and the conveyor belt dropping the material onto the bed.

15. The method of claim 14 including controlling the level of the material on the conveyor through use of a leveling gate disposed above the conveyor belt.

16. The method of claim 14 wherein the material is mushroom peat moss for creating a casing layer.

17. The method of claim 14 wherein the material is unpasteurized compost.

18. The method of claim 14 wherein the material is pasteurized compost.

19. The method of claim 14 wherein the material is spawned colonized compost.

20. The method of claim 14 wherein peat moss is applied to form a casing layer, applying unpasteurized compost material then, applying pasteurized compost material then and then applying spawn colonized compost.

21. The method of claim 13 wherein the hose is at least partially wrapped around a reel, and the material continues to be fed through the hose even while the hose is around the reel.

* * * * *